United States Patent [19]

Oldenkamp

[11] Patent Number: 5,440,218
[45] Date of Patent: Aug. 8, 1995

[54] REVERSIBLE SWITCHED RELUCTANCE MOTOR OPERATING WITHOUT A SHAFT POSITION SENSOR

[75] Inventor: John L. Oldenkamp, Fort Wayne, Ind.

[73] Assignee: General Electric Company, Fort Wayne, Ind.

[21] Appl. No.: 274,488

[22] Filed: Jul. 13, 1994

[51] Int. Cl.$^6$ ............................................. H02P 7/00
[52] U.S. Cl. ................... 318/701; 318/254; 318/280
[58] Field of Search ............... 318/700, 701, 798–812, 318/254, 439, 138, 685, 696, 280–286, 287–288, 291, 720

[56] References Cited

U.S. PATENT DOCUMENTS

| | | | |
|---|---|---|---|
| 4,253,053 | 2/1981 | Ray et al. | 318/701 |
| 4,500,824 | 2/1985 | Miller | 318/701 |
| 4,595,865 | 6/1986 | Jahns | 318/254 |
| 4,611,157 | 11/1986 | Miller et al. | 318/696 |
| 4,642,543 | 2/1987 | MacMinn | 318/696 |
| 4,684,867 | 8/1987 | Miller et al. | 318/701 |
| 4,707,650 | 11/1987 | Bose | 318/685 |
| 4,713,594 | 12/1987 | Bose et al. | 318/685 |
| 4,739,240 | 4/1988 | MacMinn et al. | 318/696 |
| 4,772,839 | 9/1988 | MacMinn et al. | 318/696 |
| 4,777,419 | 10/1988 | Obradovic | 318/696 |
| 4,777,578 | 10/1988 | Jahns | 363/98 |
| 4,777,579 | 11/1988 | Jahns et al. | 363/98 |
| 4,813,248 | 3/1989 | Smith et al. | 68/23.7 |
| 4,814,964 | 3/1989 | Schauder et al. | 318/803 X |
| 4,819,460 | 4/1989 | Obradovic | 68/23.7 |
| 5,012,171 | 4/1991 | Sember | 318/696 |
| 5,012,172 | 4/1991 | Sember | 318/696 |
| 5,140,245 | 8/1992 | Stacey | 318/723 |
| 5,291,115 | 3/1994 | Ehsani | 318/701 |

OTHER PUBLICATIONS

Stabilization of Variable-Reluctance Motor Drives Operating Without Shaft Position Feedback; T. J. E. Miller, J. T. Bass, M. Ehsani.

Robust Torque Control of Switched-Reluctance Motors Without a Shaft Position Sensor; Bass, Ehsani, Miller; IEEE Transactions, vol. 1E-33, No. 33, Aug. 1986, pp. 212–216.

Simplified Electronics for Torque Control of Sensorless Switched Reluctance Motor; Bass, Ehsani, Miller; IEEE Transactions, vol. 1E-34, No. 2, May 1987, pp. 234–239.

Brushless dc Motor Control without Position and Speed Sensors; Matsui; IEEE Transactions On Industry Application vol. 28, No. 1, Jan./Feb. 1992 pp. 120–127.

Primary Examiner—Jonathan Wysocki
Attorney, Agent, or Firm—Ralph E. Krisher, Jr.

[57] ABSTRACT

A reversible switched reluctance motor and methods therefor. The motor includes a current sensor for sensing the current supplied by a DC link and for producing a current signal having a parameter representative of the current. A controller provides a control signal having a parameter representative of the desired speed and direction of rotation of a rotatable assembly of the motor. A dwell generator provides firing pulses to a converter for driving the motor and varies the duration of each of the firing pulses as a function of the speed and direction parameter and the current parameter. Further, a timing generator, responsive to the speed and direction parameter, generates a timing signal defining a rate dependent on the parameter. The dwell generator varies the pulse rate of the firing pulses as a function of the defined rate of the timing signal and the converter commutates each of the windings for a period of time and at a rate dependent on the duration and pulse rate of the firing pulses. The controller controls the speed and direction of rotation of the rotatable assembly by delaying commutation so that the motor operates as a generator for braking the rotatable assembly and by suitably varying the speed and direction parameter of the control signal.

29 Claims, 6 Drawing Sheets

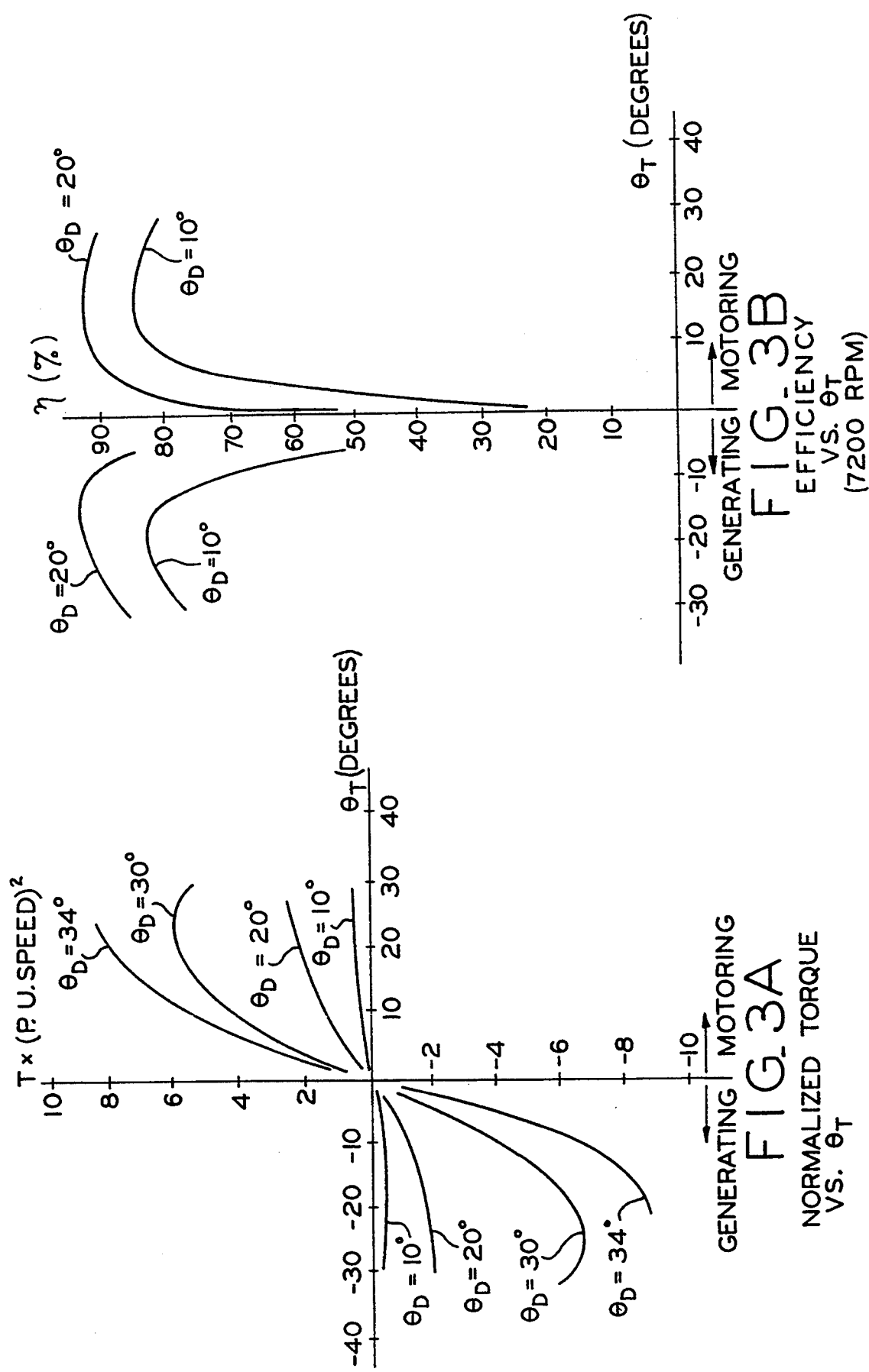

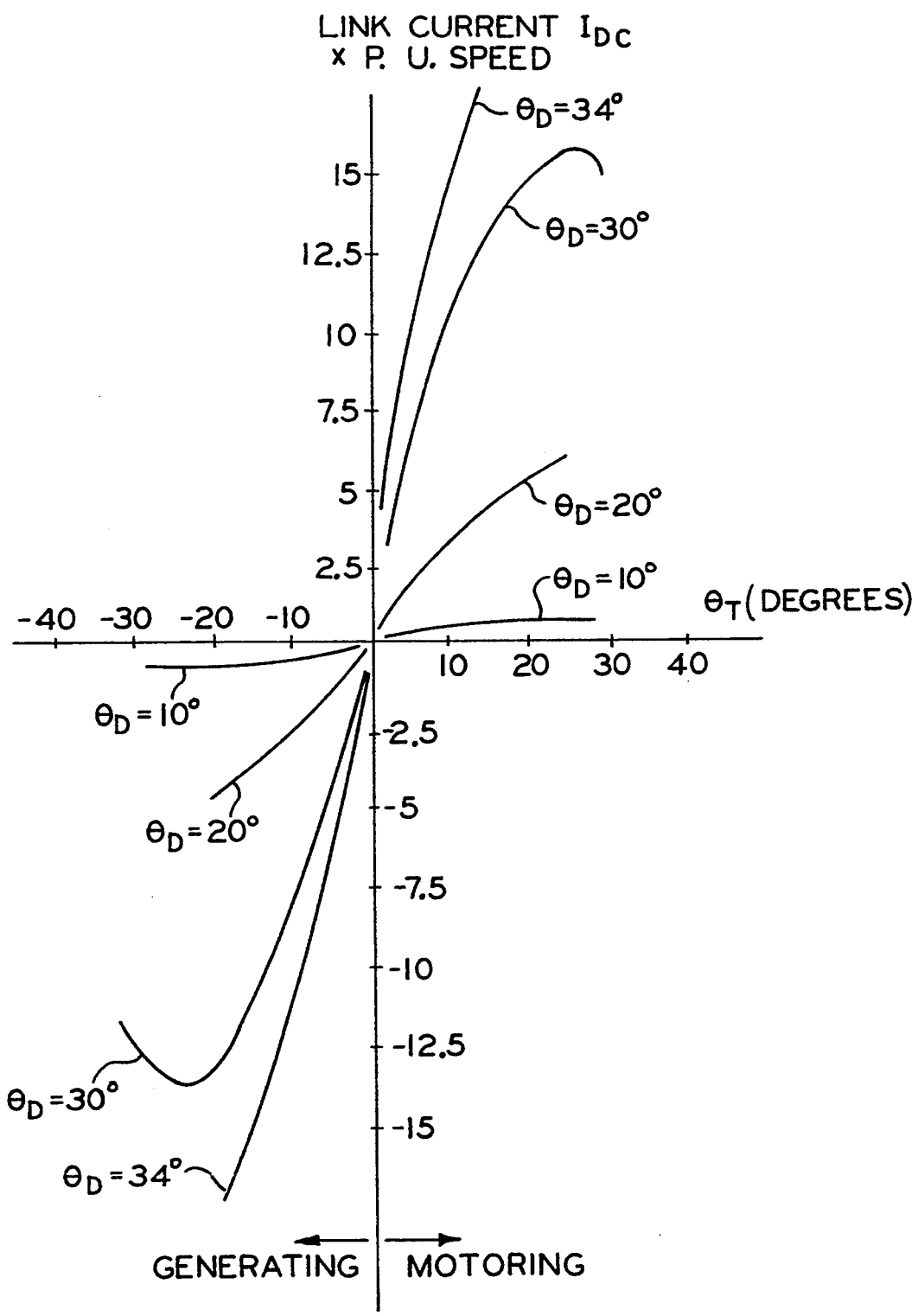
FIG_3C
NORMALIZED LINK
CURRENT VS. θ_T $\theta_D$ VS. NORMALIZED LINK CURRENT

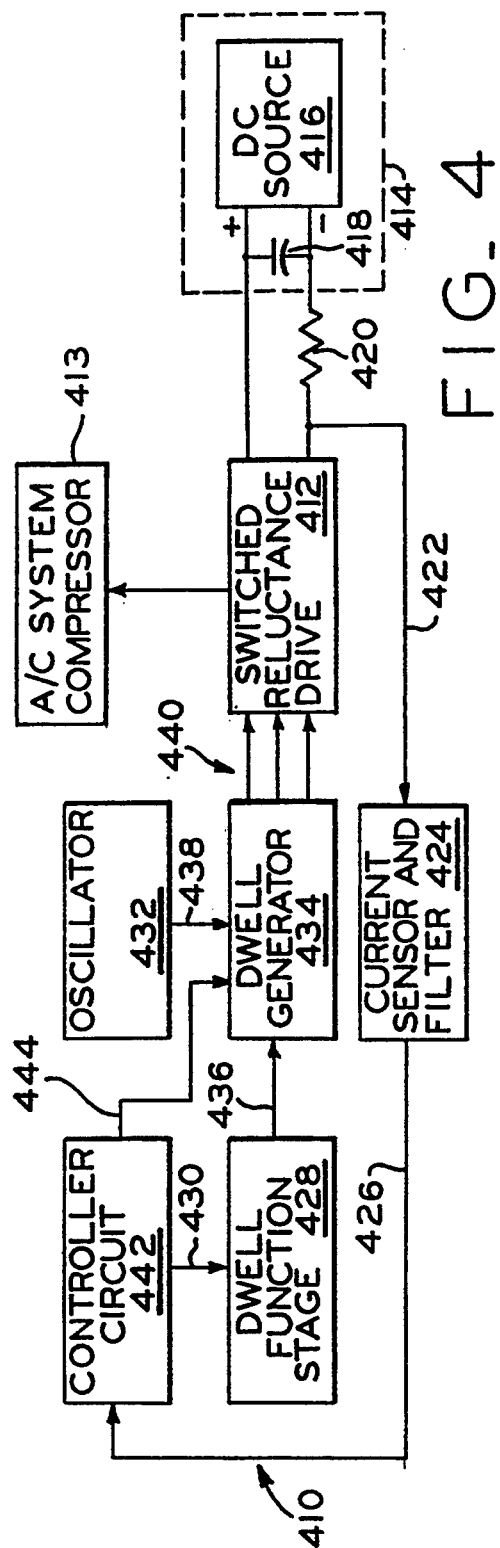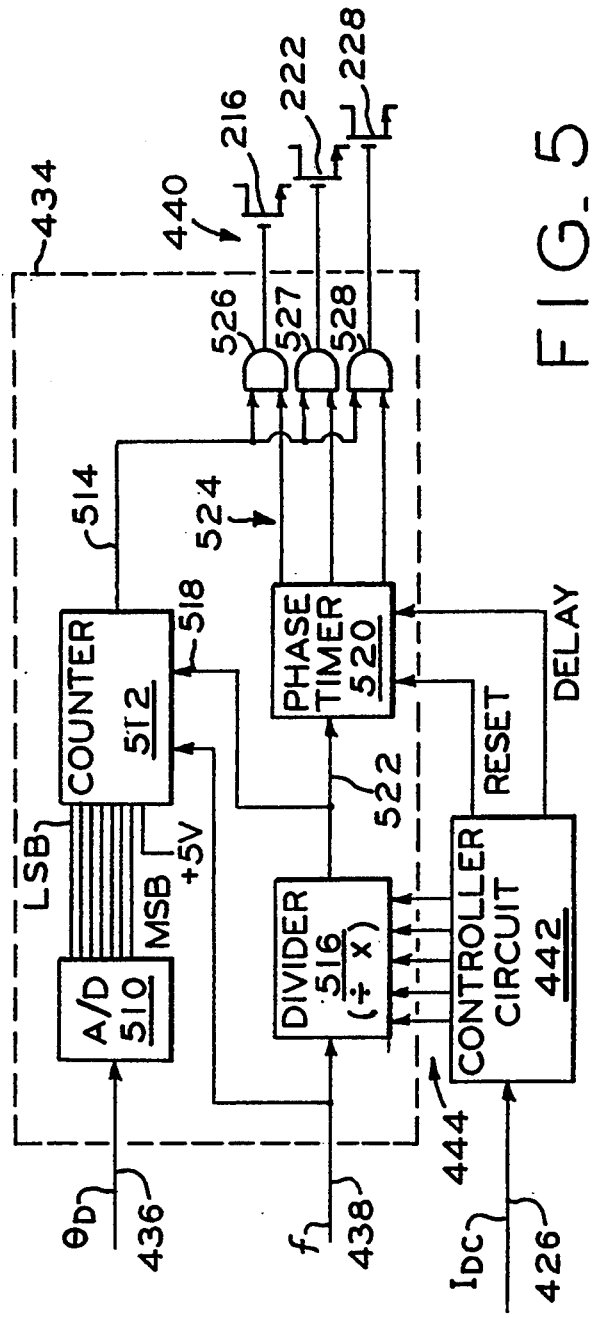

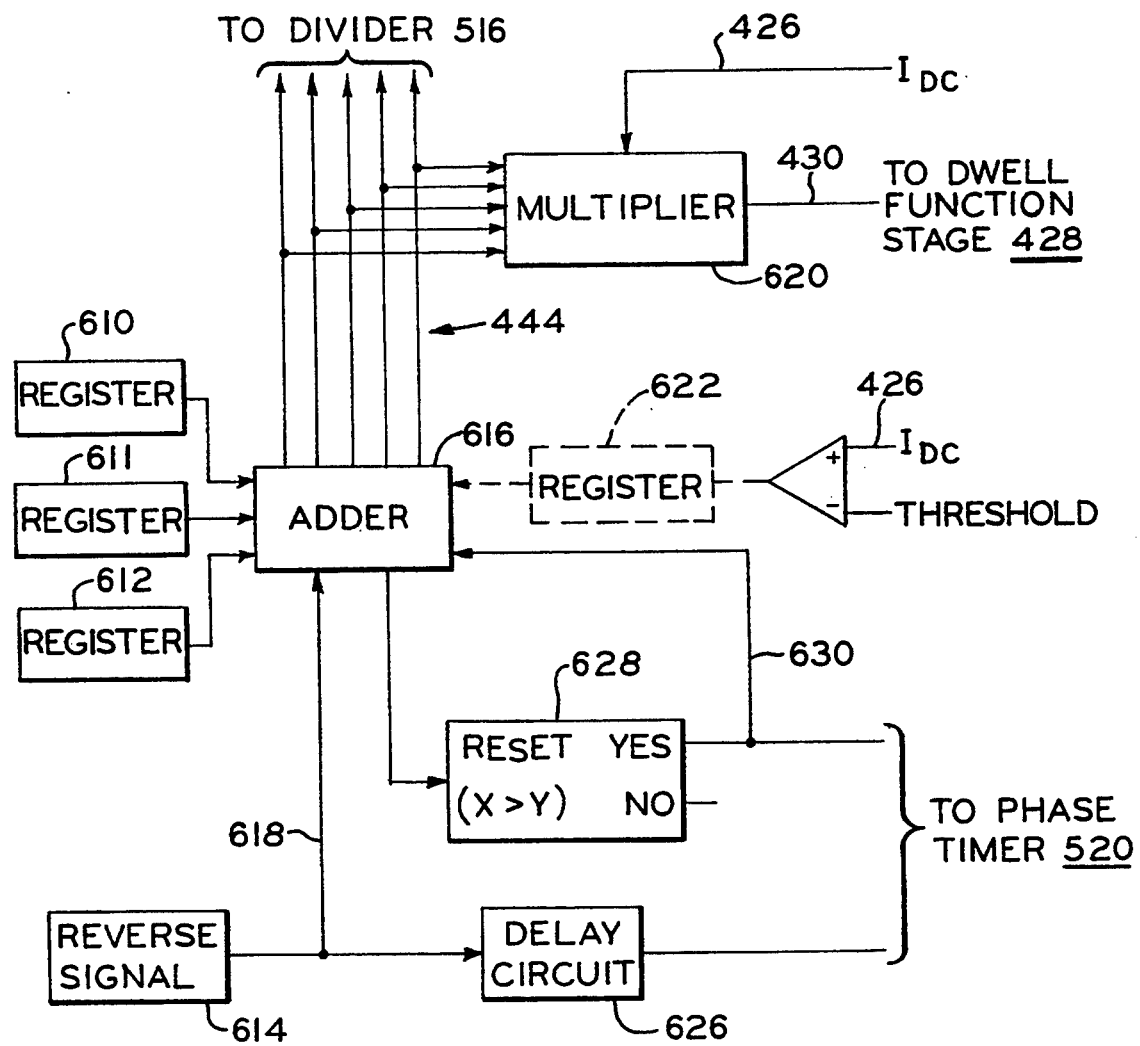
FIG_6

REVERSIBLE SWITCHED RELUCTANCE MOTOR OPERATING WITHOUT A SHAFT POSITION SENSOR

BACKGROUND OF THE INVENTION

This invention generally relates to a reversible switched reluctance motor operating without shaft position sensors and, particularly, to a circuit for varying a speed and direction parameter for controlling speed and direction of rotation in such a switched reluctance motor.

Generally, switched reluctance motors, also called variable or electronically commutated reluctance motors, are doubly salient having poles or teeth on both a stator and a rotor. Such motors include windings on the stator poles but not on the rotor poles. Typically, each pair of diametrically opposite stator windings is connected in series to form one phase of the switched reluctance motor.

The switched reluctance motor produces torque by commutating the phases in a predetermined sequence so that a magnetic force of attraction results between rotor and stator poles that are approaching each other. A converter switches off the current in each phase at a commutation point before the rotor poles nearest the stator poles corresponding to that phase rotate past an aligned position. The switched reluctance motor uses a single unidirectional current switching element, such as a thyristor or transistor, in each leg of the converter to generate unidirectional current pulses synchronized with rotor movement and to supply the current to the corresponding phase of the motor. Thus, the motor develops torque which is independent of current direction.

Each time the converter switches on a phase of the switched reluctance motor, current from a DC supply flows in a pair of stator windings. The motor converts energy drawn from the supply partly into a magnetic field and partly into mechanical energy as the rotor rotates toward a minimum reluctance configuration. When the conducting switch is opened, the motor converts part of the stored magnetic energy into mechanical output and preferably returns the remainder of the energy to the DC source.

In operation, the converter must switch the phase current on and off in precise synchronism with the position of the rotor. Typically, a shaft position sensor is used to reference the switching of the transistors in each converter leg to a set of pulses derived from the shaft position sensor to accomplish this "shaft-position switching". It is known to operate a variable reluctance stepping motor without a shaft position sensor and without loss of steps by a method wherein the converter provides very wide current pulses without reference to the rotor position. The stepping motor thus operates at a very high torque margin so that torque transients do not cause a loss of steps. While the method described for operating stepping motors has high stability, the method obtains the high torque margin at the expense of efficiency. It is also known to operate a variable reluctance motor without a shaft position sensor at high efficiency by a method wherein changing a dwell or conduction angle of the phase currents in response to a change in load torque allows dynamic increase of the torque margin. While this method provides high efficiency, it does not provide a scheme for efficiently reversing the direction of rotation in the motor.

Variable reluctance motors, including switched reluctance motors, are disclosed in U.S. Pat. Nos. 4,611,157, 4,707,650, 5,012,171 and 5,012,172, all of which are commonly assigned with the present application and the entire disclosures of which are incorporated herein by reference in their entirety.

SUMMARY OF THE INVENTION

Among the several objects of this invention may be noted the provision of an improved switched reluctance motor which permits reversing the direction of rotation in the motor; the provision of such a switched reluctance motor which permits operation without a shaft position sensor; the provision of such a switched reluctance motor which permits generation of a negative or braking torque as the direction of rotation changes from one direction to an opposite direction; the provision of such a switched reluctance motor which permits varying the duration of commutation as a function of a speed and direction parameter and a current parameter; the provision of such a switched reluctance motor which permits varying the rate of commutation as a function of a rate defined in response to the speed and direction parameter; the provision of such a switched reluctance motor which permits varying the speed and direction parameter for controlling the speed and direction of rotation in the motor; and the provision of such a switched reluctance motor which is economically feasible and commercially practical.

Briefly described, a reversible switched reluctance motor according to the present invention includes a rotatable assembly in magnetic coupling relation to a stationary assembly. The stationary assembly has windings adapted to be commutated in at least one preselected sequence so that the rotatable assembly rotates at a preset desired speed during steady state operation of the motor. The motor further includes a converter for commutating the windings with a current supplied to the windings by a DC link in response to firing pulses. A controller provides a control signal having a parameter representative of the desired speed and direction of rotation of the rotatable assembly. A timing generator, responsive to the speed and direction parameter, generates a timing signal defining a rate dependent on the parameter. The motor further includes a current sensor for sensing the current supplied by the DC link and which produces a current signal having a parameter representative of the current. A dwell generator provides the firing pulses to the converter and varies the duration of each of the firing pulses as a function of the speed and direction parameter of the control signal and the current parameter of the current signal. Further, the dwell generator varies the pulse rate of the firing pulses as a function of the defined rate of the timing signal and the converter commutates each of the windings for a period of time and at a rate dependent on the duration and pulse rate of the firing pulses. In this manner, the speed and direction of rotation of the rotatable assembly are controlled by suitably varying the speed and direction parameter of the control signal.

In another form, the invention is directed to a method of controlling the speed and direction of rotation of a rotatable assembly in a reversible motor. The motor has a stationary assembly in magnetic coupling relation to the rotatable assembly and including windings adapted to be commutated in at least one preselected sequence so that the rotatable assembly rotates at a preset desired speed during steady state operation of the motor. The motor further includes a DC link and a converter for commutating the windings with a current supplied by the DC link. The method includes the steps of providing a control signal having a parameter representative of the desired speed and direction of rotation of the rotatable assembly and generating timing pulses at a rate dependent on the speed and direction parameter of the control signal. Further, the method includes the steps of sensing the current supplied by the DC link and producing a current signal having a parameter representative of the current and providing firing pulses to the converter having a duration which is varied as a function of the speed and direction parameter of the control signal and of the current parameter of the current signal and having a pulse rate which is varied as a function of the rate of the timing pulses. The converter commutates each of the windings for a period of time and at a pulse rate dependent on the duration and pulse rate of the firing pulses. In this manner, the speed and direction of rotation of the rotatable assembly are controlled by suitably varying the speed and direction parameter of the control signal.

In another form, an apparatus according to the present invention controls the speed and direction of rotation of a rotatable assembly in a converter-driven reversible motor. The apparatus includes a dwell generator for providing firing pulses to the converter. The firing pulses have a variable duration and a variable pulse rate wherein the end of each firing pulse defines a commutation angle. A torque angle is defined for each firing pulse as a function of the commutation angle and the position of the rotatable assembly with respect to a stationary assembly. The apparatus further includes a controller for delaying the firing pulses in response to a directional signal. The directional signal indicates a direction of rotation opposite to that of the direction of rotation of the rotatable assembly so that the motor operates as a generator for braking the rotatable assembly during periods of time when the direction of rotation of the rotatable assembly is being reversed.

In yet another form, the invention is directed to a method of controlling the speed and direction of rotation of a rotatable assembly in a converter-driven reversible motor. The method includes the step of providing firing pulses to the converter. The firing pulses have a variable duration and a variable pulse rate wherein the end of each firing pulse defines a commutation angle. The method further includes the step of defining a torque angle for each firing pulse as a function of the commutation angle and the position of the rotatable assembly with respect to a stationary assembly and the step of delaying the firing pulses in response to a directional signal. The directional signal indicates a direction of rotation opposite to that of the direction of rotation of the rotatable assembly so that the motor operates as a generator for braking the rotatable assembly during periods of time when the direction of rotation of the rotatable assembly is being reversed.

Alternatively, the invention may comprise various other systems and methods.

Other objects and features will be in part apparent and in part pointed out hereinafter.

BRIEF DESCRIPTION OF THE DRAWINGS

FIG. 3A plots normalized torque T versus torque angle $\theta_T$ for different values of dwell angle $\theta_D$ for a reversible switched reluctance motor according to the present invention.

FIG. 3B plots efficiency versus torque angle $\theta_T$ for different values of dwell angle $\theta_D$ for a reversible switched reluctance motor according to the present invention.

FIG. 3C plots normalized DC link current $I_{DC}$ versus torque angle $\theta_T$ for different values of dwell angle $\theta_D$ for a reversible switched reluctance motor according to the present invention.

FIG. 4 is a functional block diagram showing a converter control circuit for controlling a reversible switched reluctance motor according to the present invention.

FIG. 5 is a functional block diagram showing the dwell generator of FIG. 4 in greater detail.

FIG. 6 is a functional block diagram showing the controller circuit of FIG. 4 in greater detail.

Corresponding reference characters indicate corresponding parts throughout the drawings.

DETAILED DESCRIPTION OF PREFERRED EMBODIMENTS

Figure 1:
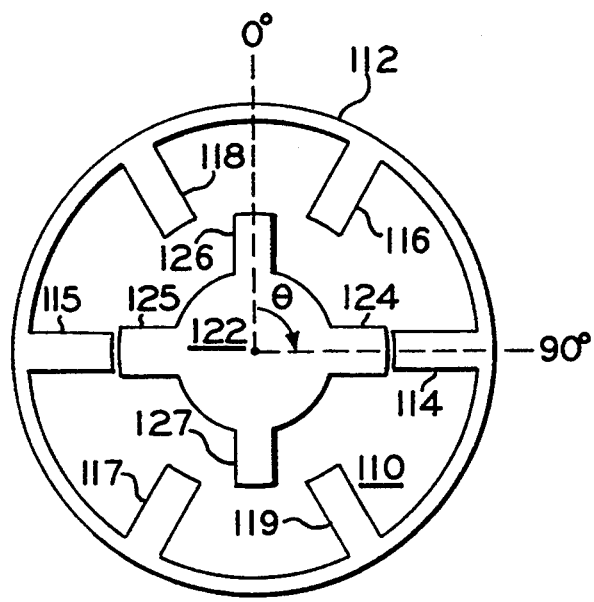
FIG. 1 is a cross-sectional view of a stator and rotor of a switched reluctance motor according to the present invention.

FIG. 1 shows a switched reluctance motor 110 according to the present invention including a stationary assembly 112. Preferably, the stationary assembly 112 is a laminated iron stator having a plurality of pole pairs 114 and 115, 116 and 117, and 118 and 119. The switched reluctance motor 110 also includes a rotating assembly 122. The rotating assembly 122 is preferably a laminated iron rotor having a plurality of pole pairs 124 and 125, and 126 and 127.

In a preferred embodiment of the invention, the number of stator poles 114–119 is greater than the number of rotor poles 124–127 so that there is one more pair of stator poles than rotor poles. Further, a winding (not shown) is wound on each of stator poles 114–119. The winding for each stator pole is connected in series to the winding for the other stator pole of the stator pole pair to form a phase winding. For example, the windings for stator poles 114 and 115 are connected in series.

Figure 2:
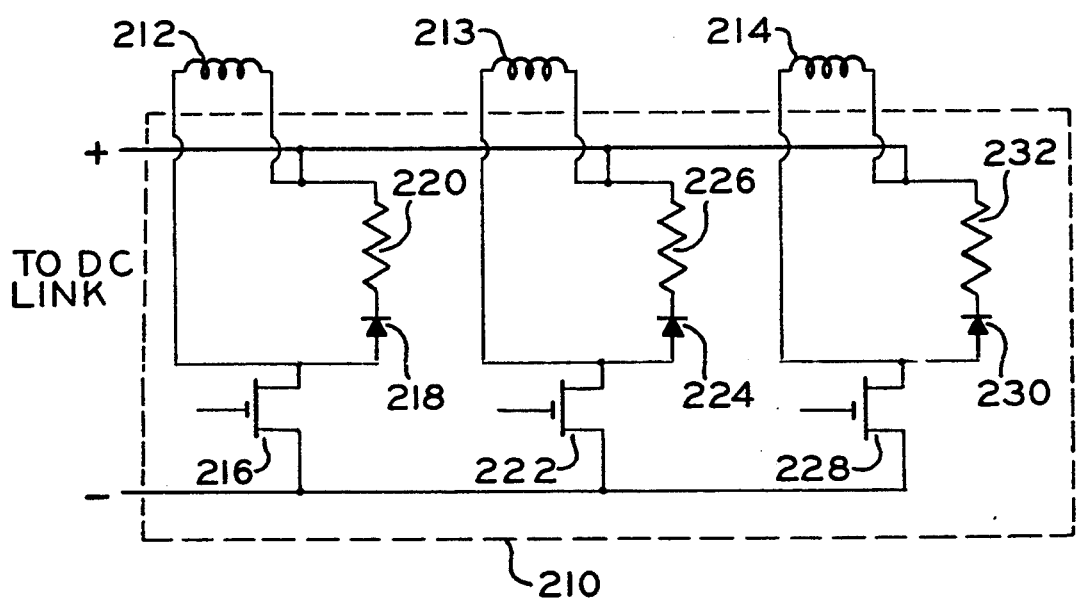
FIG. 2 is a schematic diagram of phase windings and a converter circuit for the switched reluctance motor of FIG. 1.

The schematic diagram of FIG. 2 illustrates a converter circuit 210 which energizes phase windings 212, 213 and 214 in a preselected sequence for driving motor 110. The phase windings 212–214 are each connected to a separate leg of the converter circuit 210. Specifically, the phase winding 212 corresponds to stator poles 114 and 115, the phase winding 213 corresponds to stator poles 116 and 117, and the phase winding 214 corresponds to stator poles 118 and 119. A DC link (shown in FIG. 4) supplies converter circuit 210 to provide phase currents to each of phase windings 212–214.

FIG. 2 further shows a field effect transistor (FET) 216 connected in series with phase winding 212 across the DC link. The FET 216 is also connected in series with a diode 218 and a resistor 220 wherein the series-connected diode 218 and resistor 220 are in parallel with phase winding 212. Similarly, converter circuit 210 includes a FET 222 connected in series with phase winding 213 and a series-connected diode 224 and resistor 226 in parallel with phase winding 213. Converter circuit 210 also includes a FET 228 connected in series with phase winding 214 and a series-connected diode 230 and resistor 232 in parallel with phase winding 214. The portions of converter circuit 210 connected to phase windings 213 and 214 behave identically to that described for phase winding 212 except that the energization of phase windings 213 and 214 by converter circuit 210 is phased by equal increments of rotation of rotor 122. In this manner, converter circuit 210 drives motor 110 by energizing phase windings 212, 213 and 214 in response to firing pulses being provided to FET's 216, 222 and 228.

Referring again to FIG. 1, the switching of phase winding 212 wound on stator pole pair 114-115 will be described with reference to the position of rotor pole pair 124-125. For example, a preferred embodiment of the invention defines the angular position of rotor pole 124 with respect to stator pole 114 as being measured from a position at right angles with stator pole 114. By way of illustration, FIG. 1 shows the position of rotor pole 124 corresponding to an angle $\theta=90°$. An angle $\theta_{ON}$ defines the position of rotor 122 when phase current is switched on and an angle $\theta_P$ defines the position of rotor 122 when phase current is switched off. A dwell angle $\theta_D$ defines the rotation of rotor 122 from the time phase current is switched on to the time it is switched off, i.e., $\theta_{ON}$ to $\theta_P$. The dwell angle $\theta_D$ is also referred to as the conduction angle and the turn-off angle $\theta_P$ is also referred to as the commutation angle. The difference between the equilibrium point (the aligned position of rotor pole 124 and stator pole 114) and the turn-off angle $\theta_P$ is defined as the torque angle $\theta_T$. As an example, if $\theta_{ON}=60°$ and $\theta_P=90°$ (meaning that the phase current is switched off when rotor pole pair 124-125 and stator pole pair 114-115 are exactly aligned), then $\theta_D=30°$ and $\theta_T=0°$. Likewise, if $\theta_{ON}=60°$ and $\theta_P=80°$, then $\theta_D=20°$ and $\theta_T=10°$; and if $\theta_{ON}=80°$ and $\theta_P=100°$, then $\theta_D=20°$ and $\theta_T=-10°$.

In an open loop system, controlling the dwell angle $\theta_D$ and the load at a particular speed indirectly controls the turn-off angle $\theta_P$ and, thus, controls the torque angle $\theta_T$. For a given dwell angle $\theta_D$, the torque increases with the torque angle $\theta_T$ until a maximum, or "pull out", torque is reached. Since there is no position feedback in the open loop system, rotor 122 will lose synchronism and stall if the load exceeds the pull out torque.

Figure 3D:
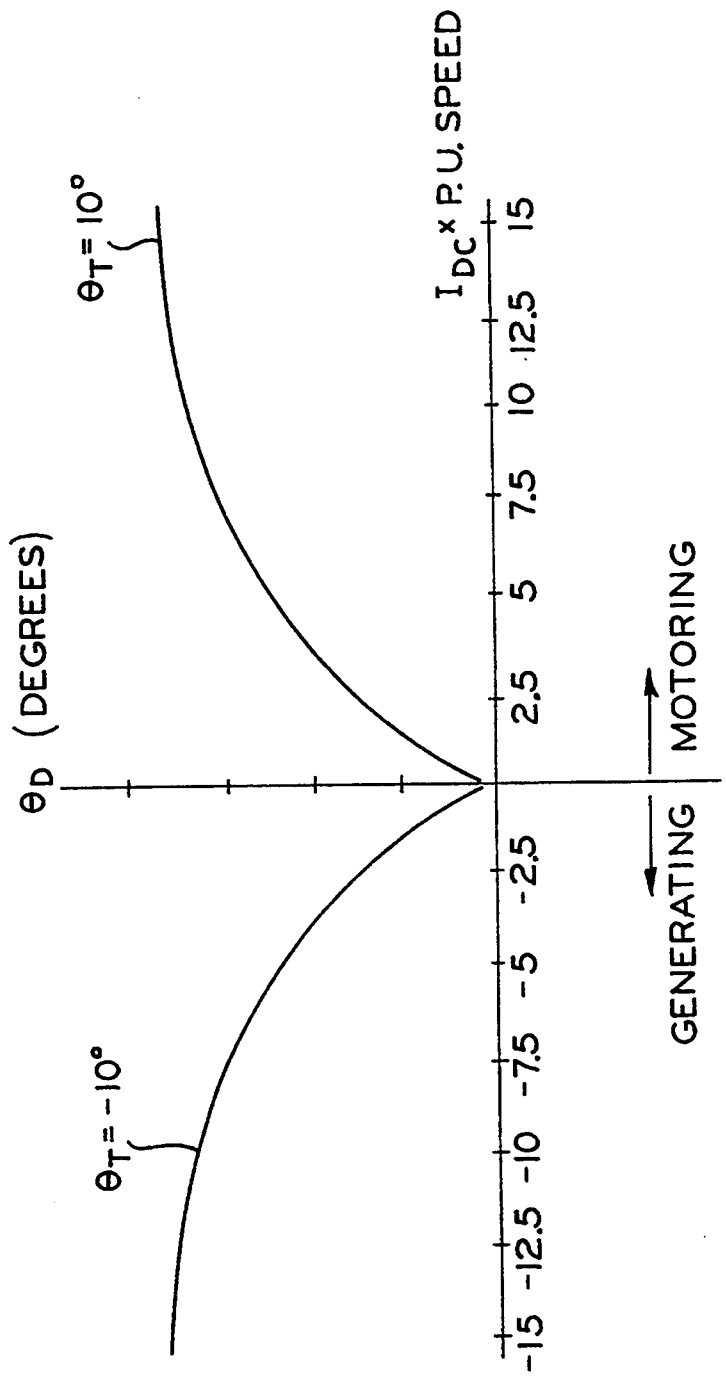
FIG. 3D plots dwell angle $\theta_D$ versus normalized DC link current $I_{DC}$ for a positive and negative torque angle $\theta_T$ for a reversible switched reluctance motor according to the present invention.

Referring to FIGS. 3A-D, certain characteristics of reversible switched reluctance motor 110 are shown as functions of the angles $\theta_D$ and $\theta_T$. FIG. 3A plots normalized torque of motor 110 shown in FIG. 1 as a function of torque angle $\theta_T$ and selected values of dwell angle $\theta_D$ at a constant speed (e.g., 7200 rpm). The torque is normalized by multiplying torque T by the square of per unit speed. As shown in FIG. 3A, the curves exhibit an inverse relationship. In other words, the curves behave similarly and each curve has a corresponding inverse curve. As such, the average torque for a torque angle $\theta_T=-10°$ is essentially the opposite of the average torque for a torque angle $\theta_T=+10°$. As described above, torque angle $\theta_T$ is defined as the angle measured from the aligned position for the point at which reverse voltage is applied. Thus, for a given dwell angle $\theta_D$, the average torque can be reversed by delaying the pulse so that reverse voltage is applied 10° after alignment of stator pole 114 and rotor pole 124. In a preferred embodiment, it is desired that torque angle $\theta_T$ be $\pm 10°$ which provides an adequate torque margin and correspond to the points of highest efficiency (see FIG. 3B). Further, a torque angle $\theta_T$ of $\pm 10°$ is equally attractive at half speed (e.g., 3600 rpm). The portion of each dwell angle $\theta_D$ curve in FIG. 3A between the maximum negative torque point and the maximum positive torque point represents a range of stable operation of motor 110. It is to be understood that motor 110 operates generally in a motoring mode but can operate in a generating mode when $\theta_T=-10°$. Operation of motor 110 in the generating mode acts to brake the rotation of rotor 122 to facilitate reversing the direction of rotation.

FIG. 3B plots efficiency as a function of torque angle $\theta_T$ and selected values of dwell angle $\theta_D$ at a constant speed (e.g., 7200). As this figure shows, the curves are approximately symmetrical about the origin and maximum efficiency of motor 110 occurs at a torque angle $\theta_T$ of about $\pm 10°$ for a given dwell angle $\theta_D$. However, operating at a small dwell angle $\theta_D$ results in a low torque margin such that switched reluctance motor 110 may become unstable when any small increase in the load is applied to motor 110.

In general, when operating a switched reluctance drive with a shaft position sensor, dwell angle $\theta_D$ and torque angle $\theta_T$ are controlled as independent variables. As a result, the third independent variable, load torque T, fixes motor frequency f which is a dependent variable. When operating switched reluctance motor 110, which does not include a shaft position sensor, motor frequency f and dwell angle $\theta_D$ are controlled, and load torque T fixes torque angle $8_T$. Average DC link current $I_{DC}$ supplied to converter 210 is a further dependent variable which is substantially proportional to load torque and is preferably used to measure load torque T.

U.S. Pat. No. 4,611,157, which is commonly assigned with the present application and the entire disclosure of which is incorporated herein by reference in its entirety, discloses a method for changing the dwell angle $\theta_D$ from any value in one commutation of converter 210 to any other value for the succeeding commutation of converter 210 in response to a torque disturbance which might cause motor 110 to stall. In other words, upon detection of a torque disturbance, dwell angle $\theta_D$ is immediately increased, providing an increase in pull out torque and stabilizing the operation of motor 110 for any value of instantaneous load torque within the capability of motor 110. As described below, the present invention additionally permits dwell angle $\theta_D$ to be changed from a value in one commutation of converter 210 to another value for a subsequent commutation of converter 210 in response to a speed and direction parameter. In this manner, the present invention reverses the direction of rotation of rotor 122 of motor 110.

FIG. 3C plots normalized DC link current $I_{DC}$ as function of torque angle $\theta_T$ and selected values of dwell angle $\theta_D$. As with the curves of FIG. 3A, the curves of FIG. 3C also exhibit an inverse relationship. The DC link current is normalized by multiplying DC link current $I_{DC}$ by per unit speed. FIG. 3C provides the basis for a control strategy according to the invention. Since it is desirable to run motor 110 as a motor with a 10° torque angle and as a generator with a $-10°$ torque angle, the desired relationship between dwell angle $\theta_D$ and average link current $I_{DC}$ is obtained by selecting each of the points on the curves corresponding to torque angles of ±10°. In this manner, the present invention provides a strategy for operating switched reluctance motor 110 at a rated speed (e.g., 7200 rpm) as well as other speeds. For example, if speed is reduced while the torque angle $\theta_T$ and dwell angle $\theta_D$ remain the same, conduction time is increased. Thus, at half speed, conduction time is doubled, link current doubles, and torque increases by a factor of four.

FIG. 3D plots the points on the curves of FIG. 3C corresponding to torque angle $\theta_T = \pm 10°$ giving the relationship between dwell angle $\theta_D$ and average DC link current $I_{DC}$ which must be maintained to achieve a torque angle $\theta_T$ of ±10°. As FIG. 3D shows, dwell angle $\theta_D$ must increase in order to maintain a constant torque angle $\theta_T$ as DC link current $I_{DC}$ increases. In this manner, switched reluctance motor 110 is operated at maximum efficiency by selecting dwell angle $\theta_D$ such that torque angle $\theta_T$ is fixed at ±10° in response to a given average DC link current $I_{DC}$.

FIG. 4 illustrates a converter control 410 in block diagram form. The converter control 410 is programmed with the value of $\theta_D$ determined by average DC link current $I_{DC}$ (as defined by the curve in FIG. 3D corresponding to $\theta_T = \pm 10°$). In one preferred embodiment of the invention, a switched reluctance drive 412 drives a rotatable component, such as a compressor 413 of an air conditioning system. As shown in FIG. 4, the switched reluctance drive 412, comprised of motor 110, phase windings 212–214 and converter circuit 210, is supplied by a DC link 414. Preferably, the DC link 414 includes a DC source 416 and a DC link capacitor 418. A shunt resistor 420 provides an instantaneous current measurement via line 422 to a current sensor and filter 424. The current signal $I_{DC}$ is proportional to the load torque provided by the drive 412 and is used to control dwell angle $\theta_D$ of the phase currents. In a preferred embodiment of the invention, the current sensor and filter 424 is a standard low-pass RC-type filter using an operational amplifier to produce an average DC link current signal $I_{DC}$ at line 426 and including an instrument amplifier (not shown) for amplifying the instantaneous current signal from the shunt resistor 420. In an alternative embodiment, current sensor and filter 424 comprises a sampled-data filter that samples current at defined positions of rotor 122.

A dwell function stage 428 receives $I_{DC}$ (or, in the alternative, a signal representative of a function of $I_{DC}$) via line 430. In a preferred embodiment the dwell function stage 428 is a nonlinear amplifier exhibiting a response curve which is the inverse of the curve corresponding to $\theta_T = \pm 10°$ shown in FIG. 3D. Additionally, converter control 410 includes an oscillator 432 generating a frequency signal f. Since the motor is a synchronous machine, the speed at which its rotor will rotate is a function of the frequency f and the voltage applied by DC source 416. Input frequency signal f is preferably a square wave provided by a square wave generator (not shown) and remains substantially constant (e.g., 76.8 kHz). A dwell generator 434 receives $\theta_D$ and f as input signals via lines 436 and 438, respectively. The dwell generator 434 provides firing pulses to converter 210 via multiple lines 440 for controlling each of the phases of switched reluctance drive 412.

FIG. 4 further shows a controller circuit 442 (shown in detail in FIG. 6). The controller circuit 442 provides a control signal via line 444 input to dwell generator 434 for varying the speed and direction of rotation of rotor 122 of motor 110 as a function of a speed and direction parameter. The speed and direction parameter will be described in detail below.

Dwell generator 434 is shown in greater detail in FIG. 5. An A/D converter 510 receives a signal representative of dwell angle $\theta_D$ via line 436 and generates a digital word representing the desired dwell angle $\theta_D$. The most significant bit (MSB) is maintained high (+5 volts) so that the digital word has a minimum value representing a minimum dwell angle $\theta_D$ (e.g., $\theta_D = 10°$) and a maximum value representing a maximum dwell angle $\theta_D$ (e.g., $\theta_D = 34°$). The digital word is loaded into a counter 512 which counts down the digital word at a rate determined by f. The output signal of the counter 512 is high at line 514 until counter 512 counts down to zero. Thus, counter 512 produces a dwell pulse via line 514 having a duration proportional to the value of the digital word which provides the desired dwell angle $\theta_D$. At the beginning of the next commutation of converter 210, counter 512 is reset by a function of the frequency signal while the current value of the digital word is loaded into counter 512.

Input frequency f is also provided to a divider 516 included as part of dwell generator 434. The divider 516 divides the input frequency f by a value x which is determined based on the control signal from controller circuit 442. Thus, divider 516 generates a timing signal f/x for operating switched reluctance drive 412. The f/x signal is provided to counter 512 via line 518 to reset counter 512 as described above. Controller circuit 442 includes a circuit (shown in FIG. 6) for receiving a directional signal indicating a direction of rotation of rotor 122. Controller circuit 442 varies the speed and direction parameter of the control signal to decrease the defined rate of the timing signal in response to a directional signal which indicates a direction of rotation opposite to that of the direction of rotation of rotor 122. Preferably, the timing signal is a series of pulses and dwell generator 434 provides one firing pulse for each timing pulse. Therefore, divider 516 constitutes a pulse generator according to the present invention.

In a preferred embodiment of the invention, controller circuit 442 generates via multiple lines 444 a multibit control signal (i.e., the value x) which is representative of the speed and direction parameter. The value of x is varied for controlling commutation by converter 210 during reversal of switched reluctance motor 110. Preferably, controller circuit 442 generates a value of x representative of a fundamental operating frequency for use during steady state motoring. Controller circuit 442 increases the value of x (and, thus, slows the timing signal) in response to a reverse signal which causes rotation of rotor 122 to be slowed. A phase timer 520 also receives the f/x frequency signal from divider 516 via line 522 and generates a phase enable signal for each motor phase such that only one phase is on at any one time. Three enable signals at lines 524 from the phase timer 520 are each input to AND gates 526, 527 and 528 along with the dwell pulse from counter 512. The outputs of the AND gates 526–528 are connected to the gates of FET's 216, 222 and 228, respectively, of converter circuit 210 and provide firing pulses to converter 210 at lines 440.

FIG. 6 illustrates one preferred embodiment of controller circuit 442 in detail. In general, it is contemplated that controller circuit 442 may be implemented by microprocessor control. As described above, controller circuit 442 provides the control signal which communicates to divider 516 the parameter representative of the desired speed and direction of rotation of rotor 122 of motor 110. In other words, divider 516 divides the frequency f by a function of the speed and direction parameter. In a preferred embodiment of the invention, controller circuit 442 includes a plurality of registers, for example, registers 610, 611 and 612. Each register stores a value of x representative of the speed and direction parameter for causing motor 110 to change its speed and direction of rotation. As an example, register 610 stores a value of x for steady state operation of motor 110 so that f/x corresponds to a fundamental frequency. Register 611 stores a value of x so that f/x is such that the rotation of rotor 122 slows down before reversing direction. Similarly, register 612 stores a value of x so that f/x is such that the rotation of rotor 122 speeds up after reversing direction. The number of registers shown in FIG. 6 is merely illustrative. Preferably, controller circuit 442 includes a plurality of registers so that the speed of motor 110 can be smoothly decreased before reversal and smoothly increased in the opposite direction after reversal.

As described above, the timing signal provided by divider 516 is a series of pulses. By varying x, controller circuit 442 causes divider 516 to generate a first sequence of pulses in the series at a substantially constant frequency corresponding to rotation of rotor 122 in a first direction and a second sequence of pulses in the series at a varying rate corresponding to deceleration of rotor 122. Controller circuit 442 also causes divider 516 to generate a third sequence of pulses in the series at a substantially constant frequency corresponding to rotation of rotor 122 in a second direction opposite the first direction.

Controller circuit 442 further comprises a circuit 614 for receiving a directional signal indicating a desired direction of rotation of rotor 122 and is responsive to the signal for varying the speed and direction parameter of the control signal to cause divider 516 to decrease the defined rate of the timing signal in response to a directional signal which indicates a direction of rotation opposite to that of the present direction of rotation of rotor 122. An adder 616 selects the stored values of x from registers 610–612 in response to the directional signal provided by circuit 614 via line 618 for varying the value of x.

As described above, dwell function stage 428 receives a signal representative of a function of $I_{DC}$ via line 430. In a preferred embodiment, dwell function stage 428 is a nonlinear amplifier exhibiting a response curve which is the inverse of the curve corresponding to $\theta_T = \pm 10°$ shown in FIG. 3D and operates in cooperation with dwell generator 434. Dwell generator 434 separately relates a plurality of reference values to a respective plurality of time periods corresponding to the range of possible durations of the firing pulses. Controller circuit 442 includes a multiplier 619 for multiplying the values of x of the control signal by a current parameter represented by the current signal $I_{DC}$. The reference values cover a range of values corresponding to the range of possible current parameters separately multiplied by the range of possible speed and direction parameters by the multiplier 620. In this manner, dwell generator 434 sets the duration of the firing pulses as a function of the reference value determined by multiplying the current parameter of the current signal by the speed and direction parameter of the control signal.

FIG. 6 further illustrates an optional register 622 (shown in phantom). In a preferred embodiment of the invention, a comparator 624 sets a current threshold during periods of time when the direction of rotation of rotor 122 is being reversed and compares the DC link current signal $I_{DC}$ via line 426 to a peak current threshold. If $I_{DC}$ is less than the peak current threshold, the register 622 causes the adder 616 of controller circuit 442 to output a value of x which causes dwell generator 434 to increase the defined rate of the timing signal f/x. If $I_{DC}$ exceeds the peak current threshold then the register 622 causes adder 616 to output a value of x which causes dwell generator 434 to decrease the defined rate of the timing signal f/x.

For optimum reversing of motor 110, controller circuit 442 additionally includes a delay circuit 626 which generates a signal for delaying phase timer 520 by approximately 20° in response to the directional signal. For example, if motor 110 is operating with a torque angle $\theta_T = 10°$, controller circuit 442 delays $\theta_{ON}$ (which delays the occurrence of turn-off angle $\theta_P$ if dwell angle $\theta_D$ remains constant) so that torque angle $\theta_T = -10°$. Thus, motor 110 produces negative torque (operating in the generating mode) for braking rotor 122 from rotation. Further, the interval between the firing pulses is lengthened, that is, their frequency is lowered, by the control signal as a function of the speed and direction parameter based on the torque rating, inertia and load. The rate of frequency reduction is then adjusted by monitoring line current. After the direction of rotation has been reversed, controller circuit 442 further varies the control signal so that rotation in the opposite direction is encouraged.

Controller circuit 442 also includes a reset circuit 628 for generating a reset signal when the value of x exceeds a predetermined value. The reset circuit provides the reset signal to adder 616 via line 630 for indicating that rotation of rotor 122 has ceased due to the changing values of x and the braking of rotor 122. In this manner, the reset signal instructs controller circuit 442 to generate control signals for increasing the pulse rate of the firing pulses for driving rotor 122 in the reverse direction.

In operation, controller circuit 442 provides the control signal via lines 444 communicating a parameter representative of the desired speed and direction of rotation of rotor 122 of motor 110. Thus, divider 516 constitutes a timing generator, responsive to the speed and direction parameter, for generating a timing signal defining a rate dependent on the parameter. Dwell generator 434 provides firing pulses to converter 210 via lines 444 and varies the duration of each of the firing pulses as a function of the speed and direction parameter of the control signal and the current parameter of the current signal. Further, dwell generator 434 varies the pulse rate of the firing pulses as a function of the defined rate of the timing signal and converter 210 commutates each of the windings for a period of time and at a rate dependent on the duration and pulse rate of the firing pulses. In this manner, the speed and direction of rotation of rotor 122 are controlled in response to varying dwell angle $\theta_D$ by suitably varying the speed and direction parameter of the control signal.

The apparatus shown in FIG. 5 and described above provides firing pulses to the switching elements, FET's 216, 222, 228, in converter circuit 210 resulting in dwell angles preferably between 10° and 34°. Dwell angles in this range provide an acceptable operating range for switched reluctance drive 412.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A reversible motor comprising:
   a stationary assembly and a rotatable assembly in magnetic coupling relation thereto, said stationary assembly including windings adapted to be commutated in at least one preselected sequence so that the rotatable assembly rotates at a desired speed during steady state operation of the motor;
   a DC link for supplying a current to the windings;
   a converter for commutating the windings with the current supplied to the windings by the DC link in response to firing pulses;
   a controller for providing a control signal having a variable parameter representative of the desired speed and direction of rotation of the rotatable assembly;
   a timing generator responsive to the speed and direction parameter of the control signal for generating a timing signal defining a rate dependent on said parameter, said controller varying the speed and direction parameter to cause the timing generator to vary the defined rate of the timing signal;
   a current sensor for sensing the current supplied by the DC link and for producing a current signal having a parameter representative of said current; and
   a dwell generator for providing the firing pulses to the converter at a frequency which is a function of the defined rate of the timing signal;
   wherein the dwell generator varies the duration of each of the firing pulses as a function of the speed and direction parameter of the control signal and of the current parameter of the current signal;
   wherein the dwell generator varies the frequency of the firing pulses as a function of the defined rate of the timing signal; and
   wherein the converter commutates each of the windings for a period of time and at a rate dependent on the duration and frequency of the firing pulses, whereby the speed and direction of rotation of the rotatable assembly are controlled by suitably varying the speed and direction parameter of the control signal.

2. The motor of claim 1:
   wherein the dwell generator separately relates a plurality of reference values to a respective plurality of time periods corresponding to the range of possible durations of the firing pulses;
   wherein the reference values cover a range of values corresponding to the range of possible current parameters separately multiplied by the range of possible speed and direction parameters; and
   wherein the dwell generator sets the duration of the firing pulses as a function of the reference value determined by multiplying the current parameter of the current signal by the speed and direction parameter of the control signal.

3. The motor of claim 1 wherein the controller further comprises a circuit for receiving a directional signal indicating a direction of rotation of the rotatable assembly; and wherein the controller includes means responsive to the circuit for varying the speed and direction parameter of the control signal to cause the timing generator to decrease the defined rate of the timing signal in response to a directional signal which indicates a direction of rotation opposite to that of the direction of rotation of the rotatable assembly.

4. The motor of claim 3 wherein the dwell generator delays the firing pulses in response to the directional signal which indicates a direction of rotation opposite to that of the direction of rotation of the rotatable assembly so that the motor operates as a generator for braking the rotatable assembly during periods of time when the direction of rotation of the rotatable assembly is being reversed.

5. The motor of claim 1 wherein the controller includes a circuit for setting a current threshold during periods of time when the direction of rotation of the rotatable assembly is being reversed; and wherein the controller includes means responsive to the circuit for varying the speed and direction parameter of the control signal to cause the timing generator to increase the defined rate of the timing signal when the current parameter is less than the current threshold and to cause the timing generator to decrease the defined rate of the timing signal when the current parameter is greater than the current threshold.

6. The motor of claim 1 wherein the timing generator comprises a pulse generator so that the timing signal is a series of pulses and wherein the dwell generator provides one firing pulse for each timing pulse generated by the pulse generator.

7. The motor of claim 1 wherein the timing signal comprises a series of timing pulses provided by the timing generator, wherein a first sequence of pulses in the series is provided at a substantially constant frequency defining a rate corresponding to rotation of the rotatable assembly in a first direction, wherein a second sequence of pulses in the series is provided at a varying frequency defining a rate corresponding to deceleration of the rotatable assembly, and wherein a third sequence of pulses in the series is provided at a substantially constant frequency defining a rate corresponding to rotation of the rotatable assembly in a second direction.

8. The motor of claim 1 wherein the motor comprises a reversible switched reluctance drive.

9. An apparatus for controlling a converter for supplying at least one phase of a reversible motor in response to firing pulses, said converter being supplied with a current from a DC link, said motor having a stationary assembly and a rotatable assembly in magnetic coupling relation thereto, said apparatus comprising:
   a controller for providing a control signal having a variable parameter representative of a desired speed and direction of rotation of the rotatable assembly;
   a timing generator responsive to the speed and direction parameter of the control signal for generating a timing signal defining a rate dependent on said parameter, said controller varying the speed and direction parameter to cause the timing generator to vary the defined rate of the timing signal;

a current sensor for sensing the current supplied by the DC link and for producing a current signal having a parameter representative of said current; and a dwell generator for providing the firing pulses to the converter at a frequency which is a function of the defined rate of the timing signal;

wherein the dwell generator varies the duration of each of the firing pulses as a function of the speed and direction parameter of the control signal and of the current parameter of the current signal;

wherein the dwell generator varies the frequency of the firing pulses as a function of the defined rate of the timing signal; and wherein the converter commutates each of the windings for a period of time and at a rate dependent on the duration and frequency of the firing pulses, whereby the speed and direction of rotation of the rotatable assembly are controlled by suitably varying the speed and direction parameter of the control signal.

10. The apparatus of claim 9:

wherein the dwell generator separately relates a plurality of reference values to a respective plurality of time periods corresponding to the range of possible durations of the firing pulses;

wherein the reference values cover a range of values corresponding to the range of possible current parameters separately multiplied by the range of possible speed and direction parameters; and wherein the dwell generator sets the duration of the firing pulses as a function of the reference value determined by multiplying the current parameter of the current signal by the speed and direction parameter of the control signal.

11. The apparatus of claim 9 wherein the controller further comprises a circuit for receiving a directional signal indicating a direction of rotation of the rotatable assembly; and wherein the controller includes means responsive to the circuit for varying the speed and direction parameter of the control signal to cause the timing generator to decrease the defined rate of the timing signal in response to a directional signal which indicates a direction of rotation opposite to that of the direction of rotation of the rotatable assembly.

12. The motor of claim 11 wherein the dwell generator delays the firing pulses in response to the directional signal which indicates a direction of rotation opposite to that of the direction of rotation of the rotatable assembly so that the motor operates as a generator for braking the rotatable assembly during periods of time when the direction of rotation of the rotatable assembly is being reversed.

13. The apparatus of claim 9 wherein the controller includes a circuit for setting a current threshold during periods of time when the direction of rotation of the rotatable assembly is being reversed; and wherein the controller includes means responsive to the circuit for varying the speed and direction parameter of the control signal to cause the timing generator to increase the defined rate of the timing signal when the current parameter is less than the current threshold and to cause the timing generator to decrease the defined rate of the timing signal when the current parameter is greater than the current threshold.

14. The apparatus of claim 9 wherein the timing generator comprises a pulse generator so that the timing signal is a series of pulses and wherein the dwell generator provides one firing pulse for each timing pulse generated by the pulse generator.

15. The apparatus of claim 9 wherein the timing signal comprises a series of timing pulses provided by the pulse generator, wherein a first sequence of pulses in the series is provided at a substantially constant frequency defining a rate corresponding to rotation of the rotatable assembly in a first direction, wherein a second sequence of pulses in the series is provided at a varying frequency defining a rate corresponding to deceleration of the rotatable assembly, and wherein a third sequence of pulses in the series is provided at a substantially constant frequency defining a rate corresponding to rotation of the rotatable assembly in a second direction.

16. The apparatus of claim 9 wherein the motor comprises a reversible switched reluctance drive.

17. A system for driving a rotatable component comprising:

a reversible motor having a stationary assembly and a rotatable assembly in magnetic coupling relation thereto, said stationary assembly including windings adapted to be commutated in at least one preselected sequence so that the rotatable assembly rotates at a desired speed during steady state operation of the motor, said rotatable assembly in driving relation to the component;

a DC link for supplying a current to the windings;

a converter for commutating the windings with the current supplied to the windings by the DC link in response to firing pulses;

a controller for providing a control signal having a variable parameter representative of the desired speed and direction of rotation of the rotatable assembly;

a timing generator responsive to the speed and direction parameter of the control signal for generating a timing signal defining a rate dependent on said parameter, said controller varying the speed and direction parameter to cause the timing generator to vary the defined rate of the timing signal;

a current sensor for sensing the current supplied by the DC link and for producing a current signal having a parameter representative of said current; and a dwell generator for providing the firing pulses to the converter at a frequency which is a function of the defined rate of the timing signal;

wherein the dwell generator varies the duration of each of the firing pulses as a function of the speed and direction parameter of the control signal and of the current parameter of the current signal;

wherein the dwell generator varies the frequency of the firing pulses as a function of the defined rate of the timing signal; and wherein the converter commutates each of the windings for a period of time and at a pulse rate dependent on the duration and frequency of the firing pulses, whereby the speed and direction of rotation of the rotatable assembly are controlled by suitably varying the speed and direction parameter of the control signal.

18. An air conditioning system comprising:

a compressor for circulating a refrigerant through an evaporator;

a motor having a stationary assembly and a rotatable assembly in magnetic coupling relation thereto, said stationary assembly including windings adapted to be commutated in at least one preselected sequence so that the rotatable assembly rotates at a desired speed during steady state operation of the motor, said rotatable assembly in driving relation to the compressor for driving the compressor;

a DC link for supplying a current to the windings;

a converter for commutating the windings with the current supplied to the windings by the DC link in response to firing pulses;

a controller for providing a control signal having a variable parameter representative of the desired speed of the rotatable assembly;

a timing generator responsive to the speed parameter of the control signal for generating a timing signal defining a rate dependent on said parameter, said controller varying the speed parameter to cause the timing generator to vary the defined rate of the timing signal;

a current sensor for sensing the current supplied by the DC link and for producing a current signal having a parameter representative of said current; and a dwell generator for providing the firing pulses to the converter at a frequency which is a function of the defined rate of the timing signal;

wherein the dwell generator varies the duration of each of the firing pulses as a function of the speed parameter of the control signal and of the current parameter of the current signal;

wherein the dwell generator varies the frequency of the firing pulses as a function of the defined rate of the timing signal; and wherein the converter commutates each of the windings for a period of time and at a pulse rate dependent on the duration and frequency of the firing pulses, whereby the speed of the rotatable assembly is controlled by suitably varying the speed parameter of the control signal.

19. An open loop method of controlling the speed and direction of rotation of a rotatable assembly in a reversible motor, the motor having a stationary assembly in magnetic coupling relation to the rotatable assembly, said stationary assembly including windings adapted to be commutated in at least one preselected sequence so that the rotatable assembly rotates at a desired speed during steady state operation of the motor, the motor having a DC link and a converter for commutating the windings with a current supplied by the DC link, said method comprising the steps of:

providing a control signal having a variable parameter representative of the desired speed and direction of rotation of the rotatable assembly;

generating a timing signal defining a rate dependent on the speed and direction parameter of the control signal;

varying the speed and direction parameter thereby to vary the defined rate of the timing signal;

sensing the current supplied by the DC link and producing a current signal having a parameter representative of said current; and providing firing pulses to the converter having a duration which is varied as a function of the speed and direction parameter of the control signal and of the current parameter of the current signal and having a frequency which is varied as a function of the defined rate of the timing signal; and wherein the converter commutates each of the windings for a period of time and at a pulse rate dependent on the duration and frequency of the firing pulses, whereby the speed and direction of rotation of the rotatable assembly are controlled by suitably varying the speed and direction parameter of the control signal.

20. The method of claim 19 wherein the step of providing firing pulses includes the steps of:

separately relating a plurality of reference values to a respective plurality of time periods corresponding to the range of possible durations of the firing pulses, the reference values covering a range of values corresponding to the range of possible current parameters separately multiplied by the range of possible speed and direction parameters; and setting the duration of the firing pulses as a function of the reference value determined by multiplying the current parameter of the current signal by the speed and direction parameter of the control signal.

21. The method of claim 19 wherein the step of providing a control signal includes the steps of:

receiving a directional signal indicating a direction of rotation of the rotatable assembly; and varying the speed and direction parameter of the control signal so that the defined rate of the timing signal decreases in response to a directional signal which indicates a direction of rotation opposite to that of the direction of rotation of the rotatable assembly.

22. The method of claim 21 further comprising the step of delaying the firing pulses in response to the directional signal which indicates a direction of rotation opposite to that of the direction of rotation of the rotatable assembly so that the motor operates as a generator for braking the rotatable assembly during periods of time when the direction of rotation of the rotatable assembly is being reversed.

23. The method of claim 19 wherein the step of providing a control signal includes the steps of:

setting a current threshold during periods of time when the direction of rotation of the rotatable assembly is being reversed; and varying the speed and direction parameter of the control signal so that the defined rate of the timing signal increases when the current parameter is less than the current threshold and decreases when the current parameter is greater than the current threshold.

24. The method of claim 19 wherein the timing signal is a series of pulses and wherein the step of providing firing pulses provides one firing pulse for each timing pulse generated.

25. The method of claim 19 wherein the step of generating a timing signal includes providing a series of timing pulses, wherein a first sequence of pulses in the series is provided at a substantially constant frequency defining a rate corresponding to rotation of the rotatable assembly in a first direction, wherein a second sequence of pulses in the series is provided at a varying frequency defining a rate corresponding to deceleration of the rotatable assembly, and wherein a third sequence of pulses in the series is provided at a substantially constant frequency defining a rate corresponding to rotation of the rotatable assembly in a second direction.

26. A method of controlling a converter for supplying at least one phase of a reversible motor in response to firing pulses, the converter being supplied with a current from a DC link, the motor having a stationary assembly and a rotatable assembly in magnetic coupling relation thereto, said method comprising the steps of:

provifding a control signal having a variable parameter representative of the desired speed and direction of rotation of the rotatable assembly;

generating a timing signal defining a rate dependent on the speed and direction parameter of the control signal;

varying the speed and direction parameter thereby to vary the defined rate of the timing signal;

sensing the current supplied by the DC link and producing a current signal having a parameter representative of said current; and providing the firing pulses to the converter having a duration which is varied as a function of the speed and direction parameter of the control signal and of the current parameter of the current signal and having a frequency which is varied as a function of the defined rate of the timing signal; and wherein the converter commutates each of the windings for a period of time and at a pulse rate dependent on the duration and frequency of the firing pulses, whereby the speed and direction of rotation of the rotatable assembly are controlled by suitably varying the speed and direction parameter of the control signal.

27. A method of controlling a reversible motor for driving a rotatable component, the motor having a stationary assembly and a rotatable assembly in magnetic coupling relation thereto, the stationary assembly including windings adapted to be commutated in at least one preselected sequence so that the rotatable assembly rotates at a desired speed during steady state operation of the motor, the rotatable assembly in driving relation to the component, the motor having a DC link and a converter for commutating the windings with a current supplied by the DC link, said method comprising the steps of:

providing a control signal having a variable parameter representative of the desired speed and direction of rotation of the rotatable assembly;

generating a timing signal defining a rate dependent on the speed and direction parameter of the control signal;

varying the speed and direction parameter thereby to vary the defined rate of the timing signal;

sensing the current supplied by the DC link and producing a current signal having a parameter representative of said current; and providing the firing pulses to the converter having a duration which is varied as a function of the speed and direction parameter of the control signal and of the current parameter of the current signal and having a frequency which is varied as a function of the defined rate of the timing signal; and wherein the converter commutates each of the windings for a period of time and at a pulse rate dependent on the duration and frequency of the firing pulses, whereby the speed and direction of rotation of the rotatable assembly are controlled by suitably varying the speed and direction parameter of the control signal.

28. A method of operating an air conditioning system including a compressor for circulating a refrigerant through an evaporator and a motor in driving relation to the compressor, the motor having a stationary assembly and a rotatable assembly in magnetic coupling relation to the rotatable assembly, said stationary assembly including windings adapted to be commutated in at least one preselected sequence so that the rotatable assembly rotates at a desired speed during steady state operation of the motor, the motor having a DC link and a converter for commutating the windings with a current supplied by the DC link, said method comprising the steps of:

providing a control signal having a variable parameter representative of the desired speed of the rotatable assembly;

generating a timing signal defining a rate dependent on the speed parameter of the control signal;

varying the speed parameter thereby to vary the defined rate of the timing signal;

sensing the current supplied by the DC link and producing a current signal having a parameter representative of said current; and providing the firing pulses to the converter having a duration which is varied as a function of the speed parameter of the control signal and of the current parameter of the current signal and having a frequency which is varied as a function of the defined rate of the timing signal; and wherein the converter commutates each of the windings for a period of time and at a pulse rate dependent on the duration and frequency of the firing pulses, whereby the speed of the rotatable assembly is controlled by suitably varying the speed parameter of the control signal.

29. A motor comprising:

a stationary assembly and a rotatable assembly in magnetic coupling relation thereto, said stationary assembly including windings adapted to be commutated in at least one preselected sequence so that the rotatable assembly rotates at a desired speed;

a DC link for supplying a current to the windings;

a converter for commutating the windings with the current supplied to the windings by the DC link in response to firing pulses;

a controller for providing a control signal having a variable parameter representative of the desired speed of the rotatable assembly;

a timing generator responsive to the speed parameter of the control signal for generating a timing signal defining a rate dependent on said parameter, said controller varying the speed parameter to cause the timing generator to vary the defined rate of the timing signal;

a current sensor for sensing the current supplied by the DC link and for producing a current signal having a parameter representative of said current; and a dwell generator for providing the firing pulses to the converter at a frequency which is a function of the defined rate of the timing signal;

wherein the dwell generator varies the duration of each of the firing pulses as a function of the speed parameter of the control signal and of the current parameter of the current signal;

wherein the dwell generator varies the frequency of the firing pulses as a function of the defined rate of the timing signal; and wherein the converter commutates each of the windings for a period of time and at a rate dependent on the duration and frequency of the firing pulses, whereby the speed of the rotatable assembly is controlled by suitably varying the speed parameter of the control signal without the need for a position sensor sensing the position of the rotatable assembly.

* * * * *